US011391618B2

(12) United States Patent
Broager et al.

(10) Patent No.: US 11,391,618 B2
(45) Date of Patent: Jul. 19, 2022

(54) SCREW FEEDER FOR A COMBINATION WEIGHER

(71) Applicant: Marel A/S, Aarhus (DK)

(72) Inventors: Anne Broager, Ega (DK); Ole Kaastrup, Hinnerup (DK); Michael Tjornelund, Randers (DK)

(73) Assignee: MAREL A/S, Aarhus N (DK)

( * ) Notice: Subject to any disclaimer, the term of this patent is extended or adjusted under 35 U.S.C. 154(b) by 453 days.

(21) Appl. No.: 16/477,720

(22) PCT Filed: Jan. 12, 2018

(86) PCT No.: PCT/EP2018/050743
§ 371 (c)(1),
(2) Date: Jul. 12, 2019

(87) PCT Pub. No.: WO2018/130646
PCT Pub. Date: Jul. 19, 2018

(65) Prior Publication Data
US 2019/0368917 A1 Dec. 5, 2019

(30) Foreign Application Priority Data

Jan. 13, 2017 (DK) .......................... PA 2017 70024
Jul. 13, 2017 (EP) ..................................... 17181216

(51) Int. Cl.
*G01G 13/20* (2006.01)
*G01G 19/393* (2006.01)
(Continued)

(52) U.S. Cl.
CPC ............. *G01G 13/20* (2013.01); *B65G 19/04* (2013.01); *B65G 33/265* (2013.01);
(Continued)

(58) Field of Classification Search
CPC ...... G01G 13/20; G01G 13/026; G01G 13/06; G01G 19/393; B65G 19/04; B65G 33/265
See application file for complete search history.

(56) References Cited

U.S. PATENT DOCUMENTS

| 4,662,508 A | 5/1987 | Inoue et al. |
| 7,732,718 B2 | 6/2010 | Tatsuoka et al. |

(Continued)

FOREIGN PATENT DOCUMENTS

| EP | 1698868 A1 | 9/2006 |
| EP | 2116823 A2 | 11/2009 |

(Continued)

OTHER PUBLICATIONS

Extended European Search Report for EP Application No. 17181216. 7, dated Dec. 22, 2017.

(Continued)

*Primary Examiner* — Randy W Gibson
(74) *Attorney, Agent, or Firm* — Workman Nydegger

(57) ABSTRACT

This invention relates to a screw feeder adapted to be used in relation with a combination weigher, where the combination weigher comprises a dispersion unit, and a plurality of trenches surrounding the dispersion unit, where each of the plurality of trenches comprise an infeed end and a releasing end where each of the trenches and have a circular sector like shaped bottom portion, where the dispersion unit is adapted to radially disperse food products into the trenches at their receiving ends, where at each trench the received food product is advanced by said screw feeder towards the releasing end, where said screw feeder is made of a material being softer than the material of the trenches and is designed such that it has a polygon cross sectional shape having three or more edges.

13 Claims, 6 Drawing Sheets

(51) Int. Cl.
*B65G 19/04* (2006.01)
*B65G 33/26* (2006.01)
*G01G 13/02* (2006.01)
*G01G 13/06* (2006.01)

(52) U.S. Cl.
CPC ........... *G01G 13/026* (2013.01); *G01G 13/06* (2013.01); *G01G 19/393* (2013.01)

(56) References Cited

U.S. PATENT DOCUMENTS

| | | |
|---|---|---|
| 8,188,383 B2 | 5/2012 | Mikami |
| 8,851,269 B2 | 10/2014 | Hansen |
| 2013/0186696 A1 | 7/2013 | Broager et al. |

FOREIGN PATENT DOCUMENTS

| | | |
|---|---|---|
| EP | 2670669 A1 | 12/2013 |
| EP | 3112825 A1 | 1/2017 |
| JP | 2015118030 A | 6/2015 |
| WO | 2016117148 A1 | 7/2016 |

OTHER PUBLICATIONS

Danish Search Report for Application No. AP 2017 70024, dated Jul. 4, 2017.
International Search Report for Application No. PCT/EP2018/050743, dated Mar. 6, 2018.

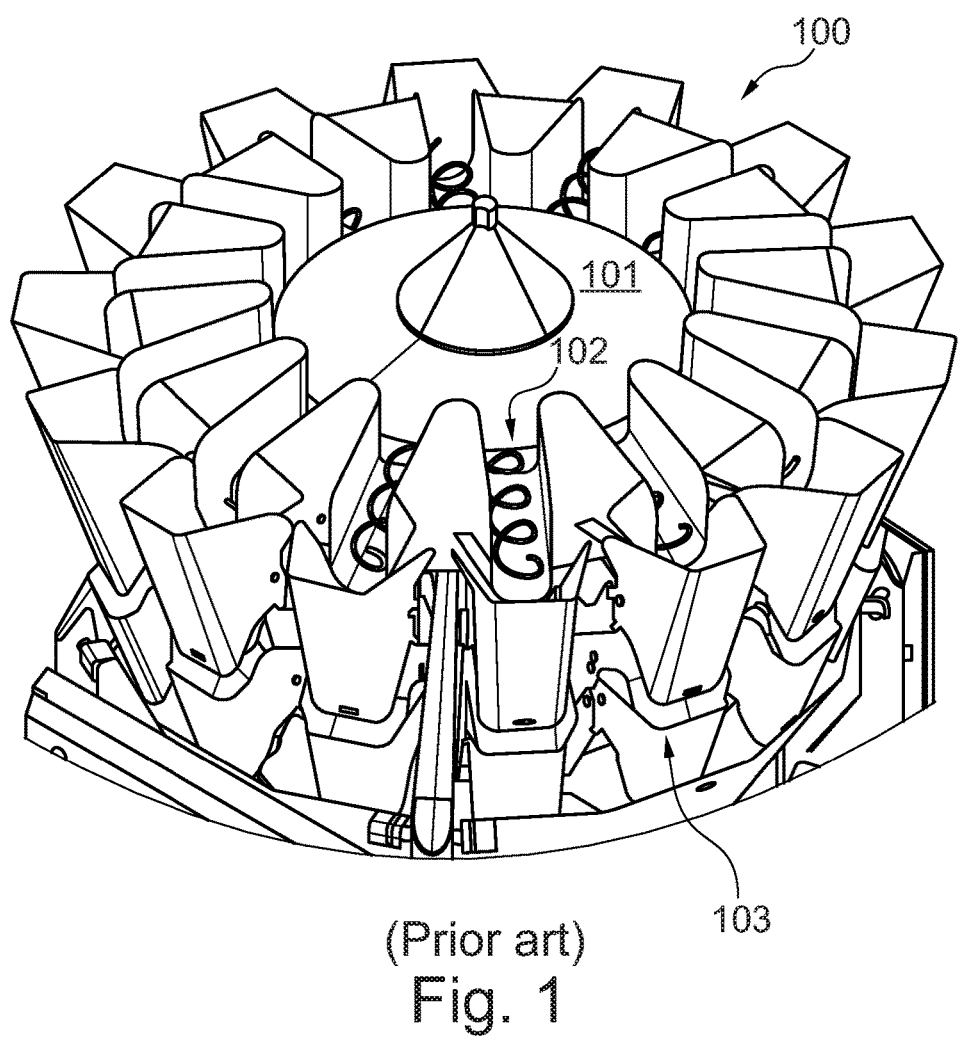
(Prior art)
Fig. 1
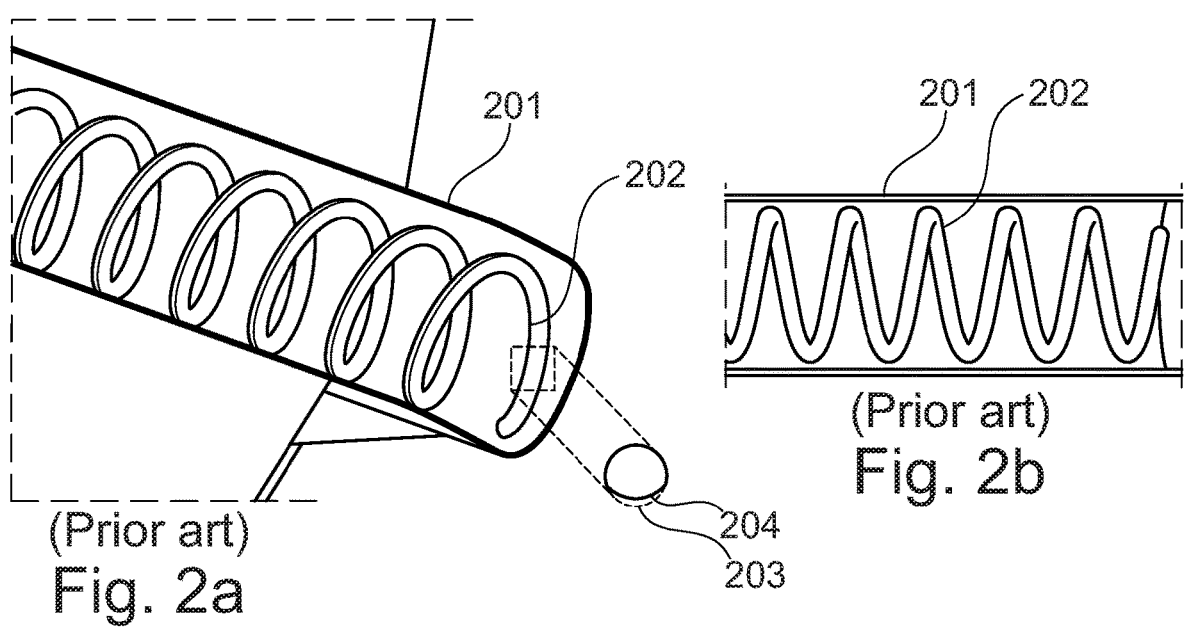
(Prior art)
Fig. 2a
(Prior art)
Fig. 2b

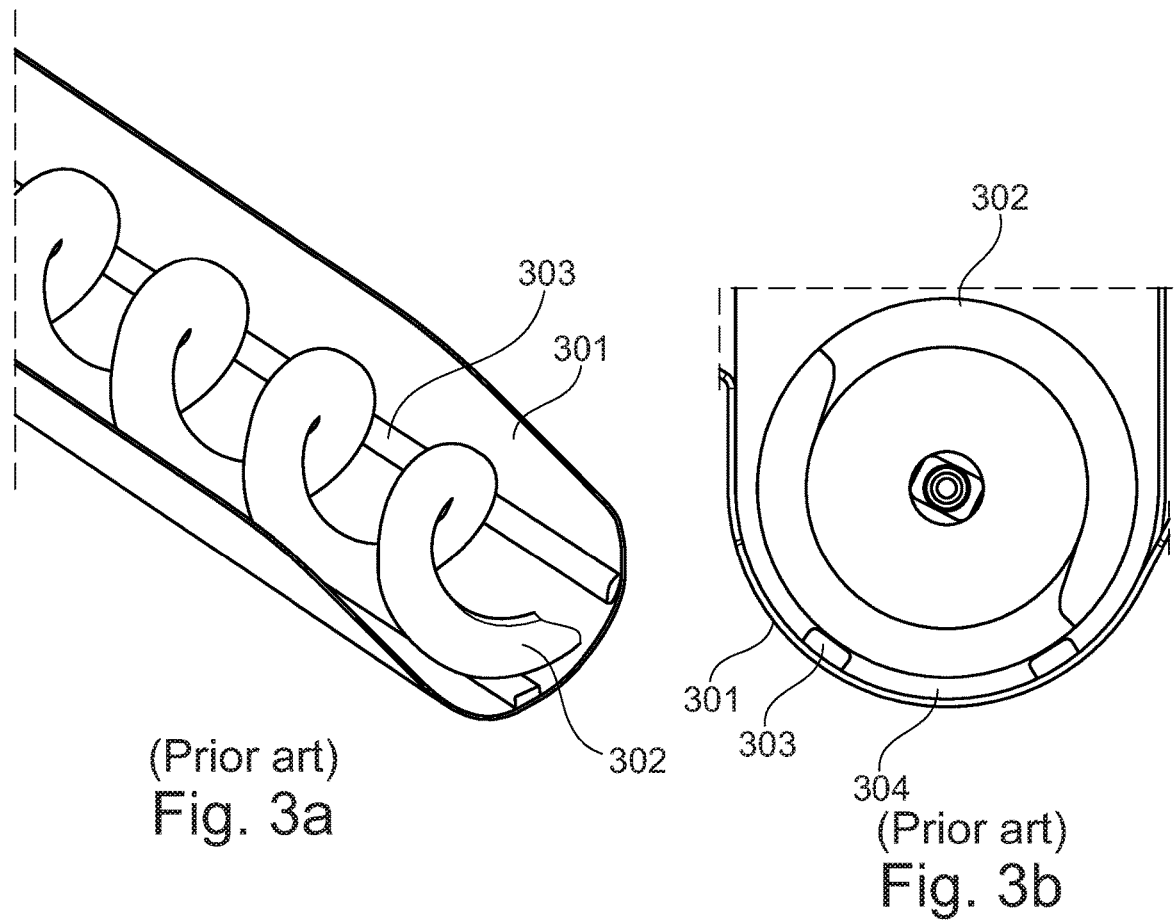
(Prior art)
Fig. 3a
(Prior art)
Fig. 3b
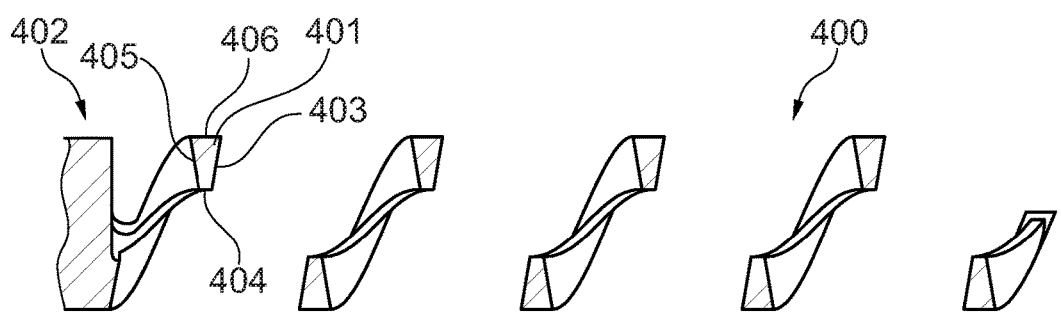
Fig. 4

SCREW FEEDER FOR A COMBINATION WEIGHER

FIELD OF THE INVENTION

The present invention relates to a screw feeder adapted to be used in relation with a combination weigher.

BACKGROUND OF THE INVENTION

Combination weighers such as the one shown in FIG. 1 100 are commonly used today in the food industry to generate portions of food products fulfilling a pre-defined weight targets. Such a combination weighers comprises a dispersion unit 101 configured to receive food items from an infeed unit typically positioned above, a plurality of conveyance 102 units that extend radially away from the dispersion units for receiving food items from the dispersion unit, and a plurality of weighing hoppers 103 associated to each of the conveyance units for receiving food products therefrom. The weighing hoppers are operated by a control unit by repeatedly monitoring the weight in each of the weighing hopper for finding an optimal weight combination in two or more weighing hoppers such that a target weight is obtained. Subsequently the food products are dropped from the selected two or more weighing hoppers into a common area, e.g. a bag, tray or the like.

Such a conveyance units consist of trenches and screw feeders arranged therein for advancing and separating food products received from the dispersion units and radially away and into the associated weighing hoppers, where both the trenches and the screw feeders are both made of steel or steel alloy materials.

FIG. 2a,b depicts graphically a perspective view and a side view of a common arrangement of such conveyance units showing a trench 201 that has a U-shape like form and a screw feeder 202 arranged therein, where as illustrated in FIG. 2b the screw feeder 202 has a diameter that is close to the diameter of the trench 201. The problem with this arrangement is that while advancing food products they have a tendency to become temporarily clamped between the trench 201 and the screw feeder 202, which may result in that the screw feeder becomes permanently askew. This has the following consequences that the friction between the trench and the screw feeder increases greatly and thus the wear of the screw feeders increases. This is illustrated graphically showing that instead of having circular cross sectional shape as shown in 203 the cross section looks something like 204. The lacking volume of metal/steel, or the lacking metal dust, has obviously over a period of time been divided into the food objects over this period of time.

This problem is partly overcome with the arrangement shown in FIG. 3a,b, where two elongated members 303 are arranged between the trench 301 and the screw feeder 302. However, the problem with this arrangement is that due to the space 304 between the elongated members 303 and the trench 301, food parts such as skin or any other types of thin objects from the food products become accumulated there between which obviously is bad for the hygiene and which increases the risk of contamination and bacterial growth.

SUMMARY OF THE INVENTION

On the above background it is an object of embodiments of the present invention to provide a screw feeder that eliminates said problems related to metal dust and that moreover reduces the risk of bacterial growth in combination weighers, in particular when working with fresh food products.

In general, the invention preferably seeks to mitigate, alleviate or eliminate one or more of the above mentioned disadvantages of the prior art singly or in any combination. In particular, it may be seen as an object of embodiments of the present invention to provide a screw feeder to be used with a combination weigher that solves the above mentioned problems, or other problems.

To better address one or more of these concerns, in a first aspect of the invention a screw feeder is provided adapted to be used in relation with a combination weigher, where the combination weigher comprises a dispersion unit, and a plurality of trenches surrounding the dispersion unit, where each of the plurality of trenches comprise an infeed end and a releasing end where each of the trenches have a circular sector like shaped bottom portion, where the dispersion unit is adapted to radially disperse food products into the trenches at their receiving ends, where at each trench the received food product is advanced by said screw feeder towards the releasing end, where said screw feeder is designed such that it has a polygon cross sectional shape having three or more edges.

In particular, the screw feeder may be made of a material being softer than the material of the trenches. Accordingly, due to the softer material, e.g. be any type of plastic material, more flexibility is provided in the screw feeder meaning that e.g. if a food object temporarily bends the screw feeder, e.g. a chicken leg is temporarily stucked between the screw feeder and the trench, it will automatically move back to its original shape. Also, due to the softer material, the radius of the screw feeder may be selected such that it may be essentially the same as the radius of the trench meaning that a scraping or shoveling effect is provided with lower noise, which prevents food products from being clamped between the screw feeders and the trenches meaning that the risk of bacterial growth is reduced or even eliminated. It should be noted the prior art screw feeders made of steel or metal cannot be designed such they have essentially the same radius as the radius of the trench because the noise would most likely be above allowable limits and because the wear from the screw feeder would most likely lead to unacceptable amount of metal dust in the food objects in the trays/bags. It would even be questionable if such prior art screw feeders could rotate at all due to the friction between the screw feeders and the trays.

More importantly, test results have shown that the wear from the screw feeder has been eliminated compared to the commonly used screw feeders that are made or steel or metal alloys, i.e. a material having similar properties as the material of the trenches, meaning that the contamination from such screw feeders in the food products is no longer present.

The term screw feeder may also be understood as an auger like structure comprising helical screw such that when placing e.g. a food product at one end of the screw feeder (the helical screw), the food product will be advanced towards the opposite end screw feeder (the helical screw).

The polygonal cross sectional shape of the screw feeder, i.e. of the material forming the winding of the screw feeder may contribute to efficiently pushing food products in the forward direction and inwardly, i.e. towards a center axis of the screw feeder. The cross sectional shape may include at least two non-parallel sides. For example, the cross-sectional shape may include two parallel and two non-parallel sides. The cross section may e.g. be trapezoid. The provision of non-parallel sides may in particular contribute to efficiently pushing food products in the forward direction and inwardly, i.e. towards a center axis of the screw feeder.

In general, the screw feeder may be made from a non-metallic material, such as, e.g., plastics, notably food-grade plastic material, plastic composites, or rubber, including natural and synthetic rubber, such as a polymerized rubber. The plastics material may in one embodiment be a thermoplastic material. In another embodiment, it may be a thermosetting material.

The screw feeder may thus, for example, be made from nylon, acrylics, polyvinyl chloride (PVC), unplasticised polyvinyl chloride (uPVC), polyethylene (PE), including high-density polyethylene (HDPE) or low-density polyethylen (LDPE), polypropylene (PP), or polycarbonate. The screw feeder may be made from mixes of different plastics materials, such as mixes of plastics and rubber, or mixes of different plastics materials.

With a view to achieving flexibility and/or avoiding abrasion, or dust formation, caused by contact between the screw feeder and the trenches, the screw feeder may preferably be made from a material having a Young's modulus, defined as the relationship between stress (force per unit area) and strain (proportional deformation) in the material, of below 100 Gpa, such as below 75 GPa, such as below 50 GPa, such as below 40 GPa, such as below 30 GPa, such as below 20 GPa, such as below 10 GPa, such as below 5 GPa, such as in the range between 0.001 and 10 GPa, such as in the range between 0.001 and 5 GPa. The aforementioned values of Young's modulus are at room temperature, i.e. 20° C.

With a view to avoiding abrasion or dust formation caused by contact between the screw feeder and the trenches, the screw feeder may preferably have a shore A hardness of less than 95, such as less than 90, such as less than 80, or between 30 and 90, such as between 40 and 90, or between 30 and 90, or between 40 and 80.

In preferred embodiments of the invention, the screw feeder is made from a plastics material, most preferably a thermoplastic material, and has a Young's modulus in the range between 0.001 and 10 GPA, and a shore A hardness of between 30 and 80.

The screw feeder is preferably configured to be able to restore its original shape after deformation or temperature changes, notably such as to be able to return to its original axial orientation after deformation. For example, the screw feeder may be made from a shape-memory polymer.

In one embodiment, at least a part of the screw feeder has a diameter D1 being essentially the same or slightly less than the diameter of the circular sector like shaped bottom portion, said at least part being the part which during use extends from the infeed end towards the releasing of the trenches. Preferably, the remaining part of said screw feeder between said infeed end and said releasing end has a different diameter D2 being less than said diameter D1. It is thus ensured that at the releasing end when releasing the food products into a hopper that no food product, e.g. chicken skin, will be clamped between the screw feeder and the trench and thus it is ensured that the food products are released from the releasing end when they are expected to be released.

In one embodiment, the length of said screw feeder is selected such that a portion of the screw feeder exceeds said releasing end of the trench. A better release control is thus provided for releasing preferably single food products one at a time into the receiving area, which may e.g. be a hopper or a weighing hopper.

In one embodiment, the screw feeder comprises a cylindrical shaped mounting end having an opening therein for engaging with a drive unit for driving the screw feeder, wherein a cylindrical boundary portion having a larger diameter than said cylindrical shaped mounting end is provided between said cylindrical shaped mounting end and the remaining part of the screw feeder, and where said cylindrical boundary portion comprises at least one askew slit extending there through and oriented in essentially the same way as the screw feeder. Such an askew slit provides an exit for food products that may become stuck at the mounting end meaning that e.g. contamination is prevented, and these food products that accidentally enter the mounting end will immediately be advance therefrom via said slit.

More importantly, it facilitated the cleaning of the screw feeder greatly because the cylindrical shaped mounting end is exposed to the food products during use meaning that when cleaning the screw feeder with e.g. water an access is provided for the water from the mounting end and out to the open meaning that flushing out residual products is possible. The screw feeder does therefore not need to be removed completely during cleaning.

In one embodiment, the screw feeder comprises a cylindrical shaped mounting end having an opening therein for engaging with a drive unit via a bolt extending from an opposite end of the mounting end with a free engaging end facing the opening, wherein the opening comprises a first cavity extending from the opening followed by at least one second cavity, where the first and at least one second cavities are designed in relation to the drive unit so as to allow the drive unit to be received in the opening and where the at least one second cavity is configured to remain the drive unit in propped position while fastening or unfastening the screw feeder to the drive unit via said bolt. In that way, the step of mounting the screw feeder to the drive unit, or to remove it therefrom is greatly facilitated since now it is ensured that the drive unit does not rotate with the mounting/unmounting via said bolt. The bolt typically comprises a threaded neck designed to engage with the drive unit in male-female manner where the drive unit may comprise an inner thread portion at its free end.

In one embodiment, said first cavity is a cylindrical shaped cavity having a first cross sectional shape, and where said at least one second cavity has a different cross sectional shape than said first cross sectional shape and has a second cross sectional areal which is less than the areal of said first cross sectional shape.

In a second aspect of the invention, the present invention relates to a combination weigher comprising the above mentioned screw feeder.

The combination weigher of the second aspect of the invention may in one example comprise:

a dispersion unit adapted to radially disperse food products dropped in from above and onto the dispersion unit, a plurality of V-shaped like guide structures extending radially away from a center of the dispersion unit and arranged such that a narrower end of the V-shaped like guide structures face a center point of the dispersion unit, and where the V-shaped like guide structures are designed such that for every second V-shaped like guide structure the distance R1 from the narrower end of the V-shaped like guide structure to the center point of the dispersion unit is smaller than the distance R2 from the narrower end of the remaining V-shaped like guide structures to the center of the dispersion unit, and where the sides of adjacent V-shaped like guide structures define side walls of trenches, where the trenches comprise circular sector shape bottom portions, where the trenches comprise receiving ends where the radially disperse food products are received from the dispersion unit and outfeed ends where the food products are released from the trenches, a plurality of hoppers associated to each of the trenches arranged below the outfeed ends of the trenches, a control unit, and screw feeders arranged in each of the trenches operated by the control unit, where the operation includes operate a rotational movement of the screw feeders and thus the conveying of the food products from the receiving ends of the trenches towards the outfeed ends of the trenches where they are released into the plurality of hoppers, wherein the space between adjacent V-shaped like guide structures at a distance R1 defines a buffer zone for radially dispersed food products from the dispersion unit, and where the screw feeders in the adjacent trenches thereof have opposite orientation and rotate in opposite directions such that upper part of the screw feeders are rotating away from each other.

The buffer zone faciliates access of larger food products to the trenches because it acts as a bigger "door" for the food products from the dispersion unit, but these larger food products are food products that might otherwise not be able to be delivered to the trenches from the dispersion unit due to their size/shape and would simply block the access of other smaller food products to the trenches. This could as an example occur for food products such as chicken fillets or poultry meat on bones, e.g. chicken thighs, which would be considered to be too large for entering the trenches. However, the fact that such food products will be accumulated in the buffer zones will greatly facility the deliver of the food items into the trenches, and more importantly, the overall size of the apparatus may thus be kept minimal, since otherwise larger trenches would result in a larger combination weigher.

Also, the buffer zone acts as a buffer for accumulated food products meaning that in case of a temporal shortage of food products at the dispersion unit, e.g. due to temporal shortage from an infeed unit that may be positioned above the dispersion unit, these accumulated food products will ensure that the temporal shortage will not affect the throughput of the combination weigher.

Moreover, the fact that the screw feeders in the adjacent trenches have opposite orientation and rotate in opposite directions such that upper part of the screw feeders are rotating away from each other will prevent the food products from being clamped between the screw feeders and the trenches. Also, a shoveling of the food products is provided that will rearrange the orientation of the food products and facilitate the feeding of the food products from the receiving ends of the trenches towards the outfeed ends of the trenches.

In one embodiment, the distances R1 are identical and constant, and where the distances R2 are identical and constant.

In one embodiment, the buffer zone comprises an upwardly extending hill-like structure comprising a ridge having a height being less than the height of the adjacent V-shaped like guide structures. In an embodiment, the upwardly extending hill-like structure extends from the distance R2 radially towards the center point of the center cone up to at least the radial distance R1, where preferably the ridge is highest at the distance R2 and does not exceed the diameter of the screw feeders (or is less), and where the height preferably gradually decreases towards the center point of the center cone. Accordingly, it is prevented that a kind of a "dead zone" is formed at the center of the buffer zone in said area between the inlet end of the adjacent V-shaped like guide structures. Moreover, due to the hill-like structure, and in particular the incline shape of it, it is ensured via the opposite rotational direction, that food products at the buffer zone will be shoveled over it and be partly re-orientated which will facilitate the optimal physical interaction between the screw feeders and the food products. This means that relative large food products, e.g. an oblonge food item such as chicken thigh, will be optimally re-orientated such that the advancing through the throughts and into the associated hopper will be possible.

In one embodiment, the dispersion unit comprises a center cone operated by a driving unit configured to move the center cone along a vertical rotational axis. This driving may be adapted to the type of food products, and may e.g. include back and forth rotation.

In one embodiment, the plurality of hoppers comprise weighing hopper and where the control unit is configured to repeatedly monitoring the weight in each of the weighing hopper for finding an optimal weight combination in two or more weighing hoppers such that a minimal overweight is obtained, and subsequently dropping the food products in the selected two or more weighing hoppers into a common area. Such weighing hoppers which are well known to a person skilled in the art may e.g. comprise one or more upper buffer compartments for accumulating food products, preferably one at a time, and where said controlling may further comprise a controlled releasing of the food products from the at least one buffer compartment and into the "weighing compartment" of the weighing hopper where the weight is registered and used to find an optimal weight combination such that the overweight will be minimized.

In one embodiment, the screw feeders extend partly out from the outfeed ends of the trenches. This may e.g. correspond to a length close to an average size of the food products and facilitates the releasing of certain amount of food products from the trenches and into the associated hoppers and minimizes the risk that additional products slide from the trenches and into the associated hoppers.

In one embodiment, the screw feeders are made of a material being softer than the material of the trences, where the radius of the sector shape bottom portions is essentially the same or larger as the outer radius of the screw feeders, and where the cross-sectional shape of the screw feeders is a polygon having three or more edges. As an example, if the trenches are made of steel or steel alloy, a preferred material of the screw feeders might be plastic material. Moreover, by have such a cross sectional shape of the screw feeders, e.g. a rectangular cross section, a scraping effect is provided between the screw feeders and the material, which will fully avoid that the food products become clamped between the screw feeders and the trenches. In one embodiment, the cross sectional shape of the material forming the winding of the screw feeder may include at least two non-parallel sides. For example, the cross-sectional shape may include two parallel and two non-parallel sides. The cross section may e.g. be trapezoid. The provision of non-parallel sides may contribute to efficiently pushing food products in the forward direction and inwardly, i.e. towards a center axis of the screw feeder.

In general, the screw feeders may be made from a non-metallic material, such as, e.g., plastics, notably food-grade plastic material, plastic composites, or rubber, including natural and synthetic rubber, such as a polymerized rubber. The plastics material may in one embodiment be a thermoplastic material. In another embodiment, it may be a thermosetting material.

The screw feeders may thus, for example, be made from nylon, acrylics, polyvinyl chloride (PVC), unplasticised polyvinyl chloride (uPVC), polyethylene (PE), including high-density polyethylene (HDPE) or low-density polyethylen (LDPE), polypropylene (PP), or polycarbonate. Not all screw feeders need to be made from the same material; different materials may be used for different screw feeders in one embodiment of the invention. The screw feeders may be made from mixes of different plastics materials, such as mixes of plastics and rubber, or mixes of different plastics materials.

With a view to achieving flexibility and/or avoiding abrasion, or dust formation, caused by contact between the screw feeders and the trenches, the screw feeders may preferably be made from a material having a Young's modulus, defined as the relationship between stress (force per unit area) and strain (proportional deformation) in the material, of below 100 Gpa, such as below 75 GPa, such as below 50 GPa, such as below 40 GPa, such as below 30 GPa, such as below 20 GPa, such as below 10 GPa, such as below 5 GPa, such as in the range between 0.001 and 10 GPa, such as in the range between 0.001 and 5 GPa.

The screw feeders are preferably configured to be able to restore their original shape after deformation or temperature changes, notably such as to be able to return to their original axial orientation after deformation. For example, the screw feeders may be made from a shape-memory polymer.

A method for generating portions of food products using a combination weigher may comprise:

a dispersion unit adapted to radially disperse food products dropped in from above and onto the dispersion unit, a plurality of V-shaped like guide structures extending radially away from a center of the dispersion unit and arranged such that a narrower end of the V-shaped like guide structures face a center point of the dispersion unit, and where the V-shaped like guide structures are designed such that for every second V-shaped like guide structure the distance R1 from the narrower end of the V-shaped like guide structure to the center point of the dispersion unit is smaller than the distance R2 from the narrower end of the remaining V-shaped like guide structures to the center of the dispersion unit, and where the sides of adjacent V-shaped like guide structures define side walls of trenches, where the trenches comprise circular sector shape bottom portions where the trenches comprise receiving ends where the radially disperse food products are received from the dispersion unit and outfeed ends where the food products are released from the trenches, a plurality of hoppers associated to each of the trenches arranged below the outfeed ends of the trenches, a control unit, and screw feeders arranged in each of the trenches operated by the control unit, where the operation includes operate a rotational movement of the screw feeders and thus the conveying of the food products from the receiving ends of the trenches towards the outfeed ends of the trenches where they are released into the plurality of hoppers, wherein the space between adjacent V-shaped like guide structures at a distance R1 defines a buffer zone for radially dispersed food products from the dispersion unit, and where the screw feeders in the adjacent trenches thereof have opposite orientation and rotate in opposite directions such that upper part of the screw feeders are rotating away from each other.

BRIEF DESCRIPTION OF THE DRAWINGS

Embodiments of the invention will be described, by way of example only, with reference to the drawings, in which FIGS. 1 to 2b show prior art screw feeders used in relation with combination weighers, FIGS. 3a, and 3b show a side cross sectional view of a screw feeder according to the present invention, FIGS. 4 and 5 show a cross sectional side view and a perspective view of one embodiment of a screw feeder according to the present invention.

DESCRIPTION OF EMBODIMENTS

Figure 5:
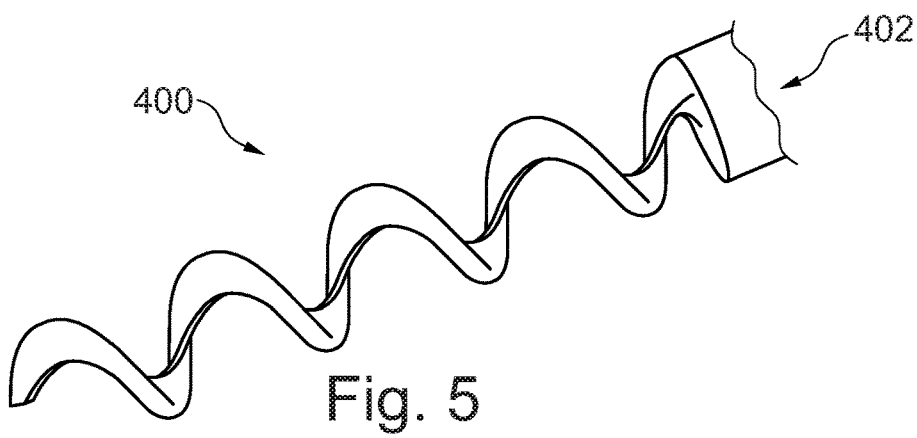

FIGS. 4 and 5 show a cross sectional side view and a perspective view of one embodiment of a screw feeder 400 according to the present invention, where the screw feeder is adapted to be used in relation with a combination weigher, e.g. such as the one depicted in FIG. 1 or similar one, where the combination weigher comprises a dispersion unit, and a plurality of trenches surrounding the dispersion unit, where each of the plurality of trenches comprise an infeed end and a releasing end. As shown in the prior art exemplary FIGS. 1 to 3b, each of the trenches have a circular sector like shaped bottom portion, and where the dispersion unit is adapted to radially disperse food products into the trenches at their receiving ends, where at each trench the received food product is advanced by said screw feeder towards the releasing end.

The screw feeder is made of a material being softer than the material of the trenches, e.g. any type of plastic or plastic like material that is flexible, and is designed such that it has a polygon cross sectional shape 401 having three or more edges, or as shown in this embodiment has four edges 403-406, preferably with one edge 406 facing the trench (see FIG. 6) so as to provide a scraping effect while advancing the food products. As will be discussed in more details later, the screw feeder 400 comprises a mounting end 402 configured to be coupled to a drive unit for driving the screw feeder. The screw feeder may have one fixed diameter, or two or more different diameters, as will be discussed in more details below.

Figure 6:
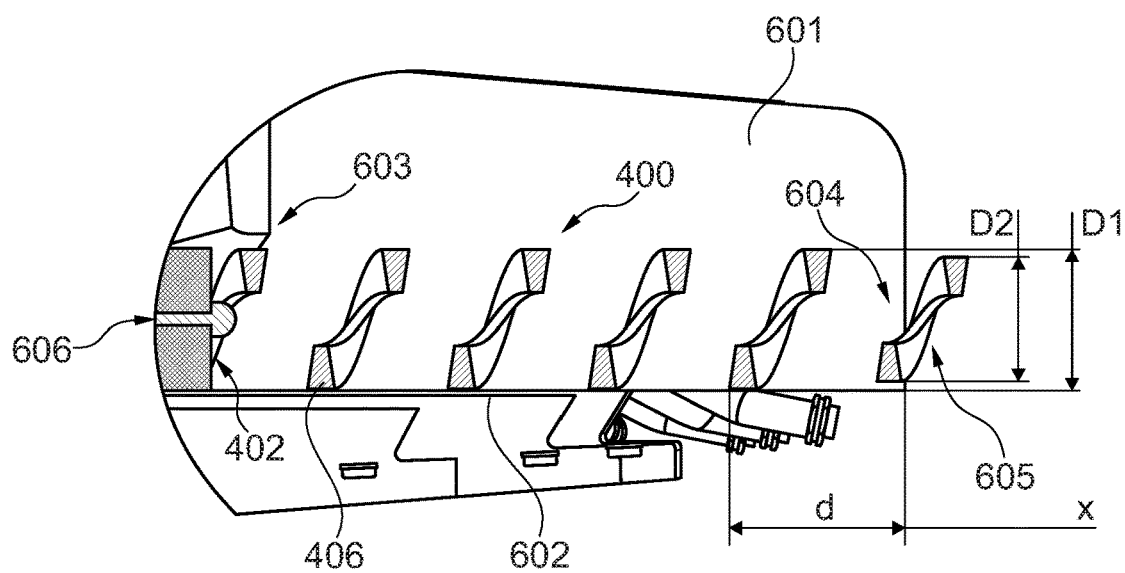
FIG. 6 depicts the embodiment of the screw feeder shown in FIGS. 4 and 5 being arranged in a trench.

FIG. 6 depicts the embodiment of the screw feeder shown in FIGS. 4 and 5 being arranged in a trench 601 having a circular sector like shaped bottom portion 602 and a side portion, where said receiving end 603 of the trench is where food products are received, and said releasing end 604 is the end, where the food products that have been advanced via the screw feeder from the receiving end, are released into e.g. any type of hoppers. In this embodiment, the screw feeder has two different diameters, namely diameter D1 and D2, where D1>D2. As shown here, D1 is the diameter extending from the receiving 601 up to a given distance d from the releasing end 604, where diameter D1 is close to being same to the diameter of the circular sector like shaped bottom portion so as to provide said scraping effect, where for the remaining part the diameter is D2. This diameter change does of course not need to be so abrupt; it may just as well gradually decrease to e.g. D2. This difference in the diameter is to ensure that food products at the releasing end 604 will not be clamped between the screw feeder and the trench, e.g. the skin of a chicken might get stucked there and thus leave the food product hanging at the releasing end.

As shown here, the length of the screw feeder 400 is selected such that a portion 605 of the screw feeder exceeds said releasing end of the trench so as to have a better control over releasing the advanced food portions, preferably to ensure that a single food product is released at a time.

The screw feeder comprises a cylindrical shaped mounting end 402 having an opening 606 therein for engaging with a drive unit.

Figure 7:
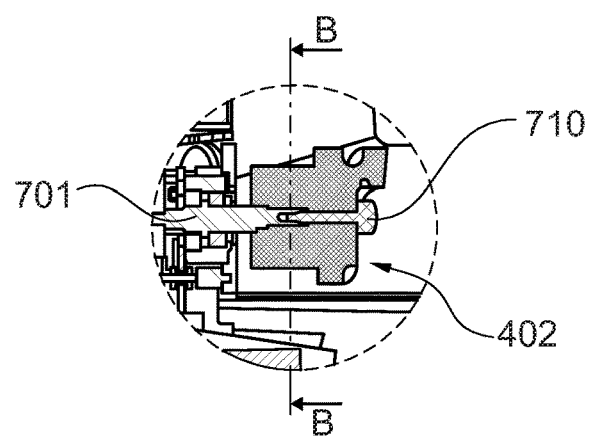
FIGS. 7 and 8 depict a zoomed up view of FIG. 6 and a zoomed up schematic view.
Figure 8:
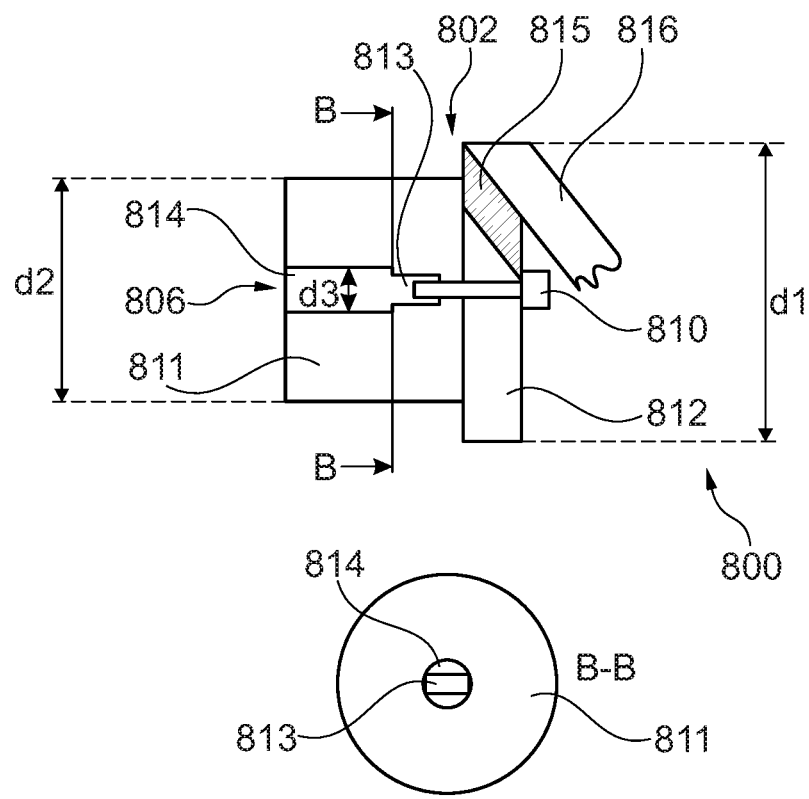

This is illustrated in more detailed way in the zoomed up view in FIG. 7 and the schematic view in FIG. 8. The zoomed up view in FIG. 7 shows the drive unit 701 having entered the opening 606 and be coupled to the screw feeder with a bolt 710, where the bolt is arranged on an opposite side of the mounting end and has an external thread and is fastened to the drive unit 701 via an internal thread at a free end of the drive unit.

Figure 9:
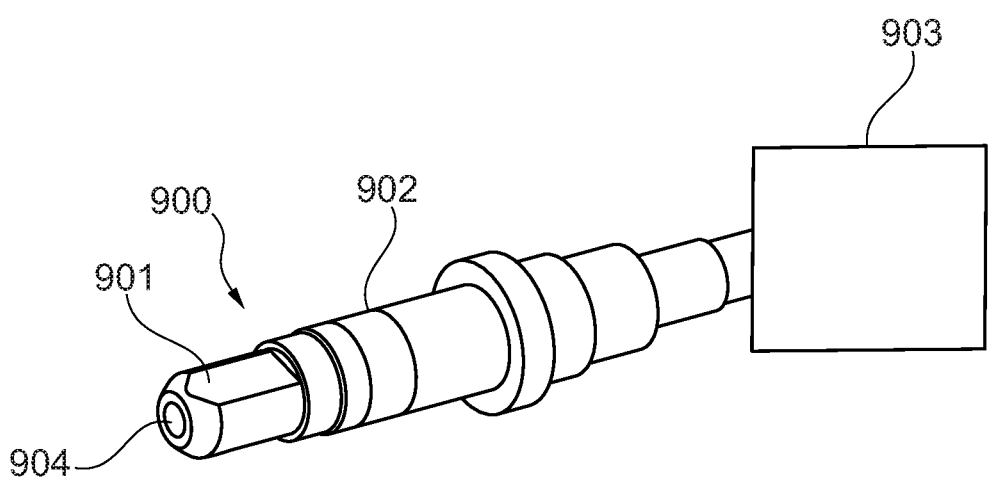
FIG. 9 shows an example of a drive unit for driving the screw feeder shown in FIGS. 4 to 7.

FIG. 8 shows a preferred embodiment of a mounting end 802 for a screw feeder 800 according to the present invention for mounting the screw feeder 800 to a drive unit, e.g. similar to the one shown in FIG. 9, that drives the screw feeder. The mounting end 802 comprises a cylindrical body 811 having diameter d2 and a cylindrical portion 812 having diameter d1>d2 that is position between the cylindrical body 811 and the remaining part of the screw feeder 800. The mounting end 802 comprises an opening 806 configured to receive the drive unit (not shown). A bolt 810 is provided at the opposite side of the mounting end 802 having a free end facing into the opening, where the bolt may be slideable attached such that it may be moved back and forth when not being mounted to the drive unit, but preferably such that it is associated with a stopper means so as for preventing the bolt to fall out from the mounting end 802. When mounted to the drive unit, the bolt is of course rigidly fixed and mounted to the drive unit.

The opening is divided into two cavities, a cylindrical cavity 814 having a diameter d3 and a second non cylindrical cavity 813 as illustrated in the B-B cross sectional view. As shown, the areal of the cross sectional shape 814 of the cylindrical cavity is larger than the areal of the cross sectional shape of the non cylindrical cavity 813. This is to facilitate the process of mounting the screw feeder to the said drive unit 900 that is connected to a motor or similar means 903. This drive unit 900 is dimension such that its distal end 901 has essentially the same geometrical shape as the inner geometry of the non cylindrical cavity 813, whereas the cylindrical portion 902 fits into the cylindrical cavity 814 of the opening 806. Accordingly, when e.g. mounting the screw feeder 800 to the drive unit 900 it will be propped in the opening 813 meaning that during fastening/unfastening process via the bolt 810 (typically a single elongated tool is used that extends through the centre of the screw feeder) via said internal thread at the free end 904 of the drive unit the drive unit will not rotate while fastening the screw feeder to the drive unit. The same applies when unscrewing the bolt.

The embodiment shown in FIG. 8 further comprises an askew slit 815 oriented in essentially the same way as the helical part 816 of the feeding screw, where the slit extends from the cylindrical body 811 and throughout the cylindrical portion 812. This is to provide an access to a cleaning water when cleaning the screw feeder since the whole mounting end 802 is exposed during operation meaning that all kinds of a dirt may be accumulated there. Also, during use, food objects may easily become accumulated at the mounting end 802, where the askew slit 815 provides an access to these accumulated food products from the mounting end 802 and during rotation will advance such food objects in a direction away from the mounting end.

Figure 10:
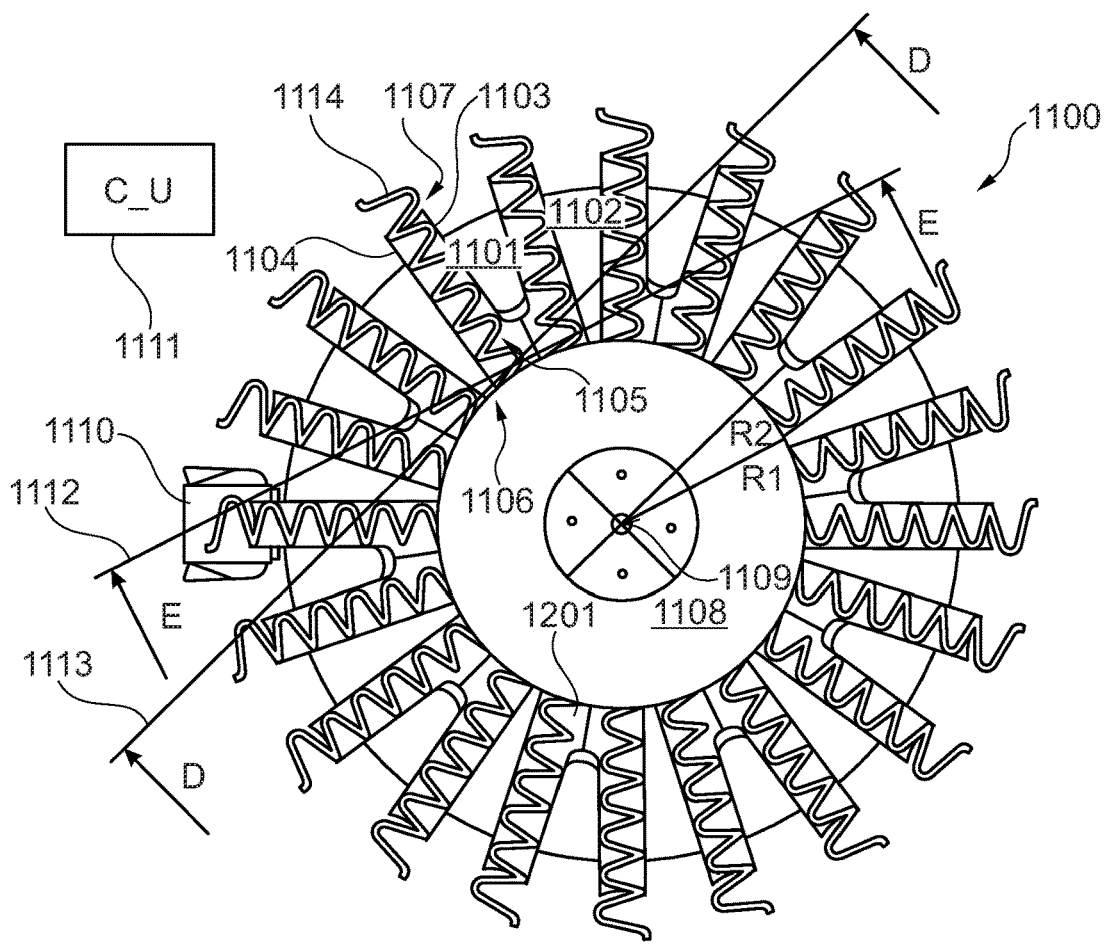
FIG. 10 shows a top view of one embodiment of a combination weigher according to the second aspect of the present invention.

FIG. 10 shows a top view of one embodiment of a combination weigher 1100 according to the present invention. The combination weigher comprises a dispersion unit 1108 adapted to radially disperse food products via rotational movement around axis 1109, preferably back and forth rotational movement, where the food products are dropped in from above from an infeed unit (not shown) and onto the dispersion unit.

The combination weigher further comprises a plurality of V-shaped like guide structures 1101,1102 extending radially away from a center 1109 of the dispersion unit 1108. The V-shaped like structures, which may also be understood as essentially U-shaped like structures, are arranged such that the narrower ends thereof face a center point of the dispersion unit 1108. The V-shaped like guide structures 1101, 1102 are further designed such that for every second V-shaped like guide structure the distance R1 from the narrower end of the V-shaped like guide structure to the center point of the dispersion unit is and is smaller than the distance R2 from the narrower end of the remaining V-shaped like guide structures to the center of the dispersion unit. As shown here, the distances R1 are identical and constant, and the distances R2 are identical and constant. The sides 1103, 1104 of adjacent V-shaped like guide structures define sides trenches 1105, where the trenches comprise circular sector shape bottom portions, and have receiving ends 1106 where the radially disperse food products are received from the dispersion unit, and outfeed ends 1107 where the food products are released from the trenches.

The combination weigher 1100 further comprises screw feeders 1114 arranged in each of the trenches 1105 operated by a control unit 1111. Each of the trenches 1105 is associated with hoppers 1110 (to simplify the drawing, only one hopper is shown), where the hoppers are arranged below the outfeed ends 1107 of the trenches 1105. The operation of the screw feeders 1114 includes operating a fully controlled rotational movement of the screw feeders in discrete steps, where the rotational movement results in the conveying of the food products from the receiving ends 1106 of the trenches towards the outfeed ends 1107 of the trenches where they are released into the plurality of hoppers 1110, preferably such that one food products falls from the trenches and into the hoppers at a time.

Figures 11, 12:
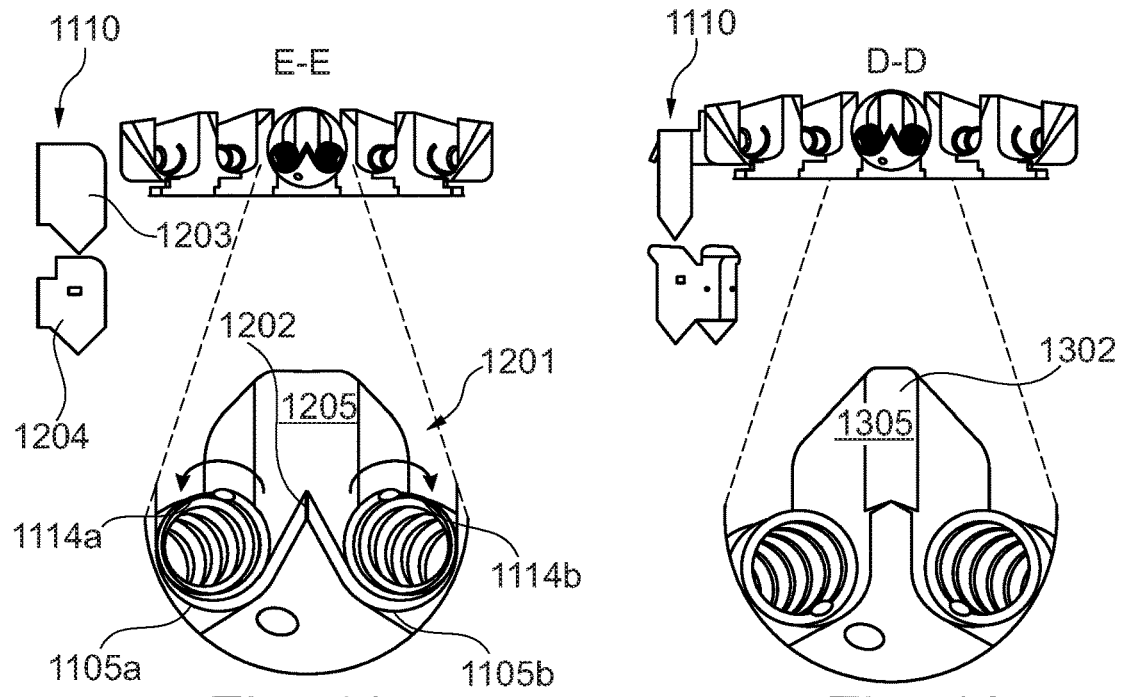
FIGS. 11 and 12 show a cross sectional view D-D and E-E in FIG. 10.

FIG. 11 shows a cross sectional view E-E 1112 in FIG. 1 and the zoomed up view depicts the space 1201 between adjacent V-shaped like guide structures at a distance R1, where the space 1201 defines a buffer zone (see also in FIG. 1) for the radially dispersed food products from the dispersion unit 1108. Moreover, as shown, the screw feeders in the adjacent trenches thereof have opposite orientation and are configured to rotate in opposite directions as indicated by the arrows such that upper part of the screw feeders are rotating away from each other. For further clarification, the opwardly extending portion 1205 is the front portion of the narrow end of the V-shaped like guide structure 1102 shown in FIG. 10.

As shown, the buffer zone 1201 comprises an upwardly extending hill-like structure comprising a ridge 1202, where the hill-like structure extends from the distance R2 radially towards the center point of the center cone up to at least the radial distance R1. Due to this structure in the buffer zone it is prevented that a kind of a "dead zone" is formed and more importantly it is ensured, via the opposite rotational direction of the screw feeders 1105a,b, that the food products at the buffer zone will be shoveled over the ridge 1202 causing the food products to fall to either of the sides and be partly re-orientated which will facilitate the optimal physical interaction between the screw feeders and the food products. This means that relative large food products, e.g. an oblong food item such as chicken thigh, will be optimally re-orientated such that the advancing through the troughs and into the associated hopper will be possible.

The plurality of hoppers 1110 may in the embodiment shown here comprise a buffer compartment 1203 where one or more food products are accumulated together, and a weighing hopper 1204 or weighing compartment positioned below, and where the control unit is configured to repeatedly monitoring the weight in each of the weighing hopper for finding an optimal weight combination in two or more weighing hoppers such that a minimal overweight is obtained, and subsequently dropping the food products in the selected two or more weighing hoppers into a common area. When the food products have been released from the weighing hopper 1204, the food products in the buffer compartment 1203 is released into the weighing hopper 1204 where the new weight if monitored and used by the control unit as new weighing data.

FIG. 12 depicts for comparison the cross sectional view D-D 1113 which shows the "wall" section 1302 between two adjacent buffer zones which prevents the food products to move from one buffer zone to the next. For further clarification, the upwardly extending portion 1305 is the front portion of the narrow end of the V-shaped like guide structure 1101 shown in FIG. 10.

Figure 13:
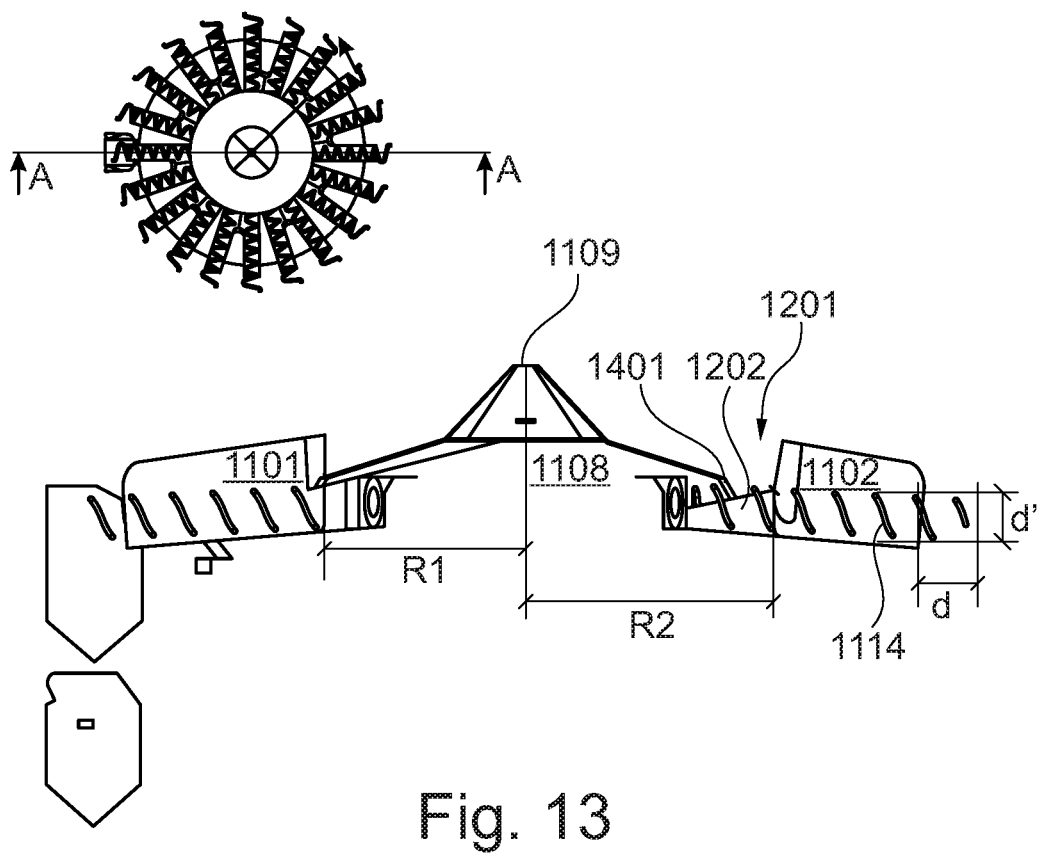
FIG. 13 depicts the cross section view A-A of FIG. 10.

FIG. 13 depicts the cross section view A-A of FIG. 10, showing in more detailed way the buffer zone 1201 and the design of the hill-like structure 1202 and the ridge, which as shown here has a height h2 at a distance R2, where h2 is less than the height of the adjacent V-shaped like guide structures, but close, or preferably somewhat less, to the diameter d' of the screw feeder 1114. Also, the upwardly extending hill-like structure 1202 extends from the distance R2 and partly below the periphery 1401 of the dispersion unit 1108, and where the height of the h2 gradually decreases such that the side view becomes incline towards the center point 1109. This shape/design of the hill like structure prevents any kind of a "dead zone" at the center of the buffer zone, and also ensures, via the opposite rotational direction of the screw feeders 1114a,b, that food products at the buffer zone will be shovelled over it and fall to either sides of the ridge and be partly re-orientated so as to facilitate the optimal physical interaction between the screw feeders and the food products.

In the embodiment shown here, the screw feeder 1114 extend partly out from the outfeed ends of the trenches, or by a distance d, where this length may correspond to a length close to an average size of the food products. This facilitates the releasing of a certain amount of food products from the trenches and into the associated hoppers and thus minimizes the risk that additional products slide from the trenches and into the associated hoppers.

Figure 14:
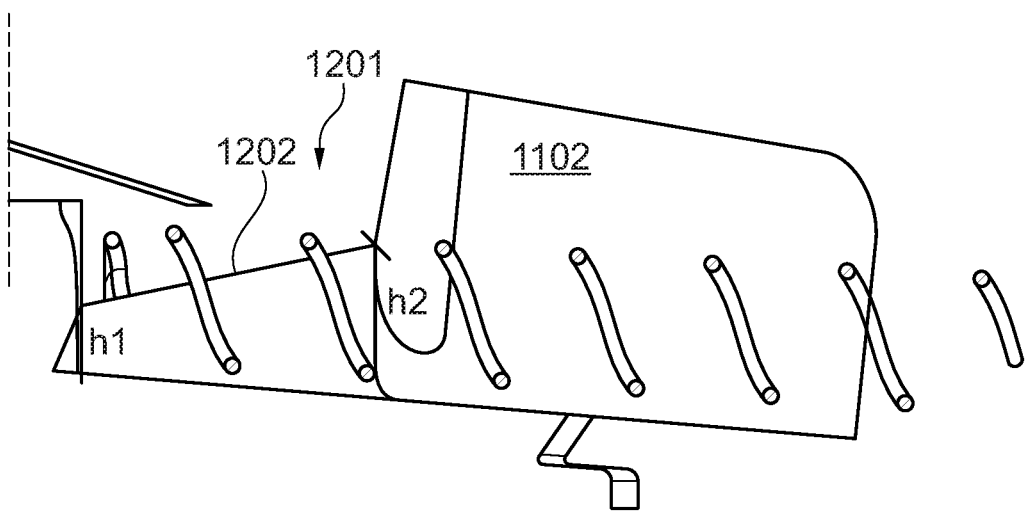
FIG. 14 shows a zoomed up view of FIG. 13.

FIG. 14 shows a zoomed up view of the buffer zone 1201 and the ridge 1202 of the upwardly extending hill-like structure comprising. Shown is also in more details how the height of the ridge gradually decreases from h2 towards the h1.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A screw feeder adapted to be used in relation with a combination weigher, where the combination weigher comprises a dispersion unit, and a plurality of trenches surrounding the dispersion unit, where each of the plurality of trenches comprise an infeed end and a releasing end where each of the trenches have a circular sector like shaped bottom portion, where the dispersion unit is adapted to radially disperse food products into the trenches at their receiving ends, where at each trench the received food product is advanced by said screw feeder towards the releasing end, where said screw feeder is designed such that it has a polygon cross sectional shape having three or more edges;
   wherein the screw feeder is made of a material being softer than the material of the trenches.

2. The screw feeder according to claim 1, wherein the screw feeder is made from a non-metallic material, and/or from a plastics material and/or from rubber.

3. The screw feeder according to claim 1, wherein the material of the screw feeder is a flexible material.

4. The screw feeder according to claim 1, wherein the material of the screw feeder has a Young's modulus of less than 10 GPa.

5. The screw feeder according to claim 1, wherein the cross sectional shape of the screw feeder has at least two mutually non-parallel sides.

6. The screw feeder according to claim 5, wherein the cross sectional shape of the screw feeder is trapezoid.

7. A screw feeder adapted to be used in relation with a combination weigher, where the combination weigher comprises a dispersion unit, and a plurality of trenches surrounding the dispersion unit, where each of the plurality of trenches comprise an infeed end and a releasing end where each of the trenches have a circular sector like shaped bottom portion, where the dispersion unit is adapted to radially disperse food products into the trenches at their receiving ends, where at each trench the received food product is advanced by said screw feeder towards the releasing end, where said screw feeder is designed such that it has a polygon cross sectional shape having three or more edges;
   wherein at least a part of the screw feeder has a diameter D1 being essentially the same or slightly less than the diameter of the circular sector like shaped bottom portion, said at least part being the part which during use extends from the infeed end towards the releasing of the trenches;
   wherein a remaining part of said screw feeder between said infeed end and said releasing end has a different diameter D2 being less than said diameter D1.

8. A screw feeder adapted to be used in relation with a combination weigher, where the combination weigher comprises a dispersion unit, and a plurality of trenches surrounding the dispersion unit, where each of the plurality of trenches comprise an infeed end and a releasing end where each of the trenches have a circular sector like shaped bottom portion, where the dispersion unit is adapted to radially disperse food products into the trenches at their receiving ends, where at each trench the received food product is advanced by said screw feeder towards the releasing end, where said screw feeder is designed such that it has a polygon cross sectional shape having three or more edges;

wherein the screw feeder comprises a cylindrical shaped mounting end having an opening therein for engaging with a drive unit for driving the screw feeder, wherein a cylindrical boundary portion having a larger diameter than said cylindrical shaped mounting end is provided between said cylindrical shaped mounting end and the remaining part of the screw feeder, and where said cylindrical boundary portion comprises at least one askew slit extending there through and oriented in essentially the same way as the screw feeder.

9. A screw feeder adapted to be used in relation with a combination weigher, where the combination weigher comprises a dispersion unit, and a plurality of trenches surrounding the dispersion unit, where each of the plurality of trenches comprise an infeed end and a releasing end where each of the trenches have a circular sector like shaped bottom portion, where the dispersion unit is adapted to radially disperse food products into the trenches at their receiving ends, where at each trench the received food product is advanced by said screw feeder towards the releasing end, where said screw feeder is designed such that it has a polygon cross sectional shape having three or more edges;

wherein the screw feeder comprises a cylindrical shaped mounting end having an opening therein for engaging with a drive unit via a bolt extending from an opposite end of the mounting end with a free engaging end facing the opening, wherein the opening comprises a first cavity extending from the opening followed by at least one second cavity, where the first and at least one second cavities are designed in relation to the drive unit so as to allow the drive unit to be received in the opening and where the at least one second cavity is configured to remain the drive unit in propped position while fastening or unfastening the screw feeder to the drive unit via said bolt.

10. The screw feeder according to claim 9, wherein said first cavity is a cylindrical shaped cavity having a first cross sectional shape, and where said at least one second cavity has a different cross sectional shape than said first cross sectional shape and has a second cross sectional areal which is less than the areal of said first cross sectional shape.

11. The screw feeder according to claim 1, wherein the screw feeder is made of plastic.

12. The screw feeder according to claim 1, wherein the length of said screw feeder is selected such that a portion of the screw feeder exceeds said releasing end of the trench.

13. A combination weigher comprising a screw feeder according to claim 1.

\* \* \* \* \*